United States Patent
Lin

(10) Patent No.: US 10,613,398 B2
(45) Date of Patent: Apr. 7, 2020

(54) ELECTROSTATIC DISCHARGE STRUCTURE OF LIQUID CRYSTAL DISPLAY PANEL, LIQUID CRYSTAL DISPLAY PANEL AND LIQUID CRYSTAL DISPLAY DEVICE

(71) Applicant: Wuhan China Star Optoelectronics Technology Co., Ltd., Wuhan, Hubei (CN)

(72) Inventor: Dan Lin, Hubei (CN)

(73) Assignee: WUHAN CHINA STAR OPTOELECTRONICS TECHNOLOGY CO., LTD., Wuhan (CN)

( * ) Notice: Subject to any disclaimer, the term of this patent is extended or adjusted under 35 U.S.C. 154(b) by 0 days.

(21) Appl. No.: 15/745,104

(22) PCT Filed: Dec. 15, 2017

(86) PCT No.: PCT/CN2017/116409
§ 371 (c)(1),
(2) Date: Jan. 15, 2018

(87) PCT Pub. No.: WO2019/041643
PCT Pub. Date: Mar. 7, 2019

(65) Prior Publication Data
US 2019/0064613 A1 Feb. 28, 2019

(30) Foreign Application Priority Data
Aug. 29, 2017 (CN) .......................... 2017 1 0757954

(51) Int. Cl.
*G02F 1/1333* (2006.01)
*G02F 1/1362* (2006.01)

(52) U.S. Cl.
CPC .. *G02F 1/136204* (2013.01); *G02F 1/133308* (2013.01); *G02F 2001/133331* (2013.01);
(Continued)

(58) Field of Classification Search
CPC ......... G02F 1/136204; G02F 1/133308; G02F 2001/133331; G02F 2001/133334; G02F 2202/22
See application file for complete search history.

(56) References Cited

U.S. PATENT DOCUMENTS

2013/0044074 A1* 2/2013 Park .................... G02F 1/13338
345/174

FOREIGN PATENT DOCUMENTS

CN 205485145 U 8/2016

* cited by examiner

*Primary Examiner* — Phu Vu
(74) *Attorney, Agent, or Firm* — Hemisphere Law, PLLC; Zhigang Ma

(57) ABSTRACT

The present disclosure discloses an electrostatic discharge structure of a LCD panel for mounting on a LCD panel with a high-resistance film, wherein the LCD panel includes a glass layer on an uppermost layer of the LCD panel covered with a high-resistance film, an edge reserved around the high-resistance film, and a conductive material layer arranged on the edge reserved on the glass panel, wherein the conductive material layer is in contact with a periphery of the high-resistance film, and the conductive material layer is connected to a GND pin of the TFT substrate through a conductive silver paste. The present disclosure also discloses a LCD panel and a LCD device. According to the embodiments of the present disclosure which can speed up the discharge of static electricity and greatly improve the static electricity generated by the tearing film and the coating film.

9 Claims, 1 Drawing Sheet

(52) U.S. Cl.
CPC ............ *G02F 2001/133334* (2013.01); *G02F 2202/22* (2013.01)

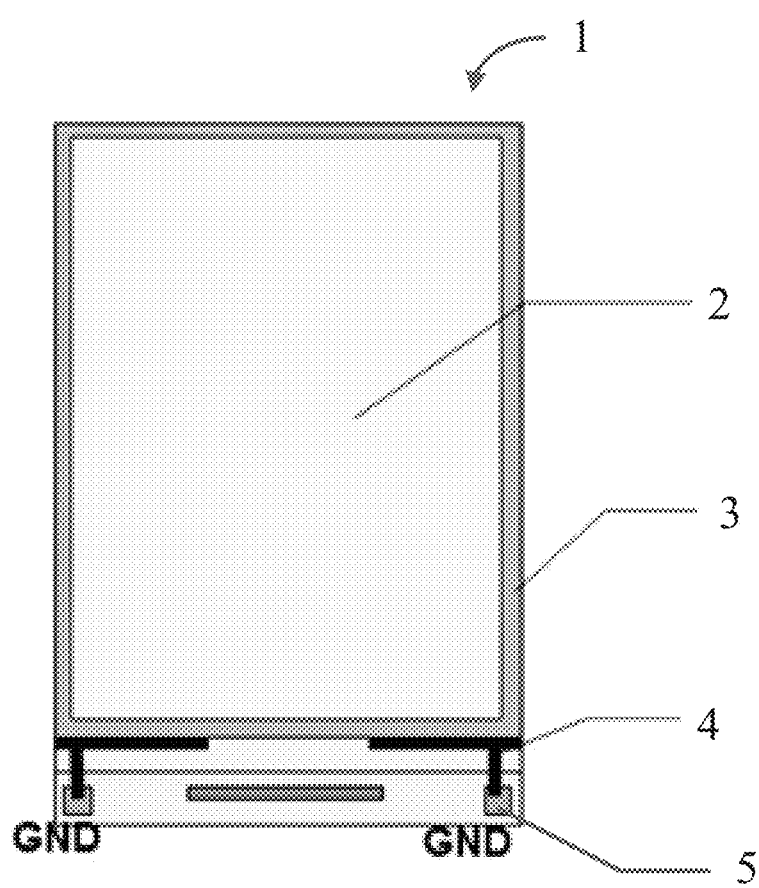

ELECTROSTATIC DISCHARGE STRUCTURE OF LIQUID CRYSTAL DISPLAY PANEL, LIQUID CRYSTAL DISPLAY PANEL AND LIQUID CRYSTAL DISPLAY DEVICE

RELATED APPLICATIONS

The present application is a National Phase of International Application Number PCT/CN2017/116409, filed Dec. 15, 2017, and claims the priority of China Application CN 201710757954.0, filed Aug. 29, 2017.

FIELD OF THE DISCLOSURE

The present disclosure relates to a thin film transistor (TFT) technology, and more particularly to an electrostatic discharge structure of a liquid crystal display panel, a liquid crystal display panel and a liquid crystal display device.

BACKGROUND OF THE DISCLOSURE

In the prior art, the surface of an In-Plane Switching (IPS) display must have a grounded shield layer, otherwise the external electric field will affect the flip state of the liquid crystal molecules, resulting in poor display.

In addition, in-cell display screen (a display panel that incorporates touch panel functionality into liquid crystal pixels) with a good grounding shield layer, will completely shield the touch signal in the cell, so that a high-resistance shield layer needs to be plated on the surface to shield the low-frequency electrostatic impact and transmit the high-frequency touch signal.

Since the high-resistance shield layer is much larger than the resistance of ITO, the static electricity generated during tearing/covering the protective film or the static electricity generated in the ESD test are hard to dissipate, resulting in the module emitting green, white, purple and other colors, and is usually difficult to dissipate in a long time (e.g., 10 s).

In order to solve the above shortcomings, usually the following means:
first, replacing the protective film suppliers, however, due to the surface resistance of the material of the protective film of the manufacturers used are not the same, resulting in the matched types are not the same;
second, increasing the area of the silver paste to speed up the discharge of the static electricity. However, this will increase the difficulty of the process, increase the risk of excess paste, and increase the cost substantially. Moreover, it is impossible to measure whether the silver paste is turned on with a multimeter.

SUMMARY OF THE DISCLOSURE

The technical problem to be solved by the present disclosure is to provide an electrostatic discharge structure of a liquid crystal display panel, a liquid crystal display panel and a liquid crystal display device, which can speed up the discharge of static electricity and greatly improve the static electricity generated by the tearing film and the coating film.

In order to solve the above technical problem, the present disclosure provides an electrostatic discharge structure of a liquid crystal display panel for mounting on a liquid crystal display panel with a high-resistance film, wherein the liquid crystal display panel at least includes a TFT substrate, a glass layer on an uppermost layer of the liquid crystal display panel covered with a high-resistance film, an edge reserved around the high-resistance film, a conductive material layer arranged on the edge reserved on the glass panel, wherein the conductive material layer is in contact with the periphery of the high-resistance film, and the conductive material layer is connected to a GND pin of the TFT substrate through a conductive silver paste.

Wherein the conductive material layer is arranged on the edge of the glass panel by coating or plating, the conductive silver paste is two segments, respectively connecting two GND pins of the TFT substrate with different positions of the conductive material layer.

Wherein a square resistance of the conductive material layer is less than or equal to 1K ohm.

Wherein the glass panel completely covers at least an AA area (Active area) of the liquid crystal display panel.

Correspondingly, an embodiment of the present disclosure further provides a liquid crystal display panel including at least a TFT substrate, a CF substrate arranged opposite to the TFT substrate, and a liquid crystal layer between the TFT substrate and the CF substrate; wherein an outermost layer of the CF substrate is a glass panel, a high-resistance film is mounted on the glass panel, an edge is reserved around a periphery of the glass panel covered with the high-resistance film, and a conductive material layer is arranged on the edge reserved by the glass panel, the conductive material layer is in contact with a periphery of the high-resistance film, and the conductive material layer is connected to a GND pin of the TFT substrate through a conductive silver paste.

Wherein the conductive material layer is arranged on the edge of the glass panel by coating or plating, the conductive silver paste is two segments, respectively connecting two GND pins of the TFT substrate with different positions of the conductive material layer.

Wherein a square resistance of the conductive material layer is less than or equal to 1K ohm.

Wherein the glass panel completely covers at least an AA area of the liquid crystal display panel.

Accordingly, in still another aspect of the embodiments of the present disclosure, a TFT liquid crystal display device using the foregoing liquid crystal display panel is further provided.

The implementation of the embodiments of the present disclosure has the following beneficial effects:
according to an embodiment of the present disclosure, by providing a conductive material layer around the high-resistance film of the cover glass panel and electrically connecting the conductive material to the GND pins of the TFT substrate, the contact area with the high-resistance film can be increased, electrostatic discharge can be accelerated, the static electricity generated by the tearing film and the film can be greatly improved, so as to improve the antistatic ability of the liquid crystal display panel;
in addition, it is easy to measure the conductive status of the conductive silver paste, thus increasing the convenience of maintenance.

BRIEF DESCRIPTION OF THE DRAWINGS

To describe the technical solutions in the embodiments of the present disclosure or in the prior art more clearly, the following briefly introduces the accompanying drawings required for describing the embodiments or the prior art. Apparently, the accompanying drawings in the following description show merely some embodiments of the present disclosure, and a person of ordinary skill in the art may still derive other drawings from these accompanying drawings without creative efforts.

FIG. 1 is a schematic structural diagram of an electrostatic discharge structure of a liquid crystal display panel according to one embodiment of the present disclosure.

DETAILED DESCRIPTION OF PREFERRED EMBODIMENTS

The technical solutions in the embodiments of the present disclosure will be described clearly and completely below with reference to the accompanying drawings in the embodiments of the present disclosure. Apparently, the described embodiments are merely some but not all embodiments of the present disclosure. All other embodiments obtained by a person of ordinary skill in the art based on the embodiments of the present disclosure without creative efforts shall fall within the protection scope of the present disclosure.

In addition, the following description of the embodiments is given with reference to the appended drawings, for the purpose of illustrating certain embodiments in which the disclosure may be practiced. As used herein, directional terms, such as "upper", "lower", "front", "back", "left", "right", "inside", "outside", "side" and the like, are only referring to the direction of the additional figures, thus, the directional terms used are used to better and more dearly illustrate and understand the present disclosure, rather than indicating or implying that the intended device or element must have a particular orientation, be constructed and operated in a particular orientation, so that can not be interpreted as a limitation of the present disclosure.

In the description of the present disclosure, it should be noted that the terms "arranged", "connected with" and "connected to" should be broadly understood unless the context dearly dictates otherwise. For example, it may be a fixed connection, a detachable connection or an integral connection. The connection may be a mechanical connection, a direct connection or an indirect connection through an intermediary medium, and may be an internal communication between two components. For those skilled in the art, the specific meanings of the above terms in the present disclosure may be understood based on specific cases.

In addition, in the description of the present disclosure, unless otherwise specified, the meaning of "plural" is two or more. The phrase "process" appearing in this specification means not only an independent process, but also a term that is intended to achieve the intended function of the process when it can not be dearly distinguished from other processes. The numerical range denoted by "~" in the present specification means a range including the numerical values described before and after "~" as the minimum value and the maximum value, respectively. In the drawings, the structures that are similar or the same are denoted by the same reference numerals.

Referring to FIG. 1, a schematic structural diagram of an electrostatic discharge structure of a liquid crystal display panel according to an embodiment of the present disclosure is shown. In this embodiment, the electrostatic discharge structure of the liquid crystal display panel for mounting on a liquid crystal display panel 1 with a high-resistance film 2, wherein the liquid crystal display panel 1 at least includes a TFT substrate, a glass layer on an uppermost layer of the liquid crystal display panel 1 covered with a high-resistance film 2, an edge reserved around the high-resistance film 2, and a conductive material layer 3 arranged on the edge reserved on the glass panel, wherein the conductive material layer 3 is in contact with a periphery of the high-resistance film 2, and the conductive material layer 3 is connected to a GND pin 5 (grounding pin) of the TFT substrate through a conductive silver paste 4.

Wherein the conductive material layer 3 is arranged on the edge of the glass panel by coating or plating, the conductive silver paste 4 is two segments, respectively connecting two GND pins 5 of the liquid crystal display panel 1 with different positions of the conductive material layer 3. It may be understood that, in an example, the conductive material used for the conductive material layer 3 may be silver paste.

Wherein a square resistance of the conductive material layer 3 is less than or equal to 1K ohm.

Wherein the glass panel completely covers at least an AA area (not shown) of the liquid crystal display panel 1. That is, the width of the conductive material layer 3 is smaller than the distance between the outer edge of the glass panel and the edge of its latest AA area.

In the meantime, another aspect of the embodiments of the present disclosure further provides a liquid crystal display panel including at least a TFT substrate, a CF substrate arranged opposite to the TFT substrate, and a liquid crystal layer between the TFT substrate and the CF substrate; wherein an outermost layer of the CF substrate is a glass panel, a high-resistance film is mounted on the glass panel, an edge is reserved around a periphery of the glass panel covered with the high-resistance film, and a conductive material layer is arranged on the edge reserved by the glass panel, the conductive material layer is in contact with a periphery of the high-resistance film, and the conductive material layer is connected to a GND pin of the TFT substrate through a conductive silver paste.

Wherein the conductive material layer is arranged on the edge of the glass panel by coating or plating, the conductive silver paste is two segments, respectively connecting two GND pins of the TFT substrate with different positions of the conductive material layer.

Wherein a square resistance of the conductive material layer is less than or equal to 1K ohm.

Wherein the glass panel completely covers at least an AA area of the liquid crystal display panel.

Accordingly, in still another aspect of the embodiments of the present disclosure, a TFT liquid crystal display using the foregoing liquid crystal display panel is further provided.

It can be understood that the electrostatic discharge structure of the liquid crystal display panel provided by the present disclosure can be applied to an IPS display as well as an in-cell display.

According to the embodiments of the present disclosure, by comparing the structure of providing the conductive material layer on the high-resistance layer according to the present disclosure and the present structure of connecting the high-resistance film and the GND pin only by using two silver paste. In the same environment, the two have no effect on the display performance of the display. However, if the surface resistance test (green emission time) is performed, the embodiments provided by the present disclosure have a shorter dissipation time, i.e., the release of static electricity is faster. The comparison results are shown in Table 1 below. The data in the first row is the voltage value for testing, the data in the second row is the dissipation time value using the prior art solution, and the data in the third row is the dissipation time value using the technical solution of the embodiment of the present disclosure.

TABLE 1

Module 9-point test, each point air discharge 5 times

|  | 4 KV | 6 KV | 8 KV | 10 KV | 12 KV |
|---|---|---|---|---|---|
| Silver paste coating 2 points | OK | Within 1 second | 2 second | 4 second | Within 7 second |
| Silver paste coating around the edge | OK | OK | Within 1 second | Within 1 second | Within 3 second |

The embodiments of the present disclosure has the following beneficial effects:
according to an embodiment of the present disclosure, by providing a conductive material layer around the high-resistance film of the cover glass panel and electrically connecting the conductive material to the GND pins of the TFT substrate, the contact area with the high-resistance film can be increased, electrostatic discharge can be accelerated, the static electricity generated by the tearing film and the film can be greatly improved, so as to improve the antistatic ability of the liquid crystal display panel;
in addition, it is easy to measure the conductive status of the conductive silver paste, thus increasing the convenience of maintenance.

The foregoing is a further detailed description of the present disclosure in conjunction with specific preferred embodiments, and it should not be considered that the specific implementation of the present disclosure is limited to these descriptions. Those skilled in the art to which the present disclosure pertains may also make some simple deductions or replacements without departing from the concept of the present disclosure and should all consider the scope of protection of the present disclosure.

What is claimed is:

1. An electrostatic discharge structure of a liquid crystal display panel for mounting on a liquid crystal display panel with a high-resistance film, wherein the liquid crystal display panel at least comprises a TFT substrate, a glass layer on an uppermost layer of the liquid crystal display panel covered with a high-resistance film, an edge reserved around the high-resistance film, and a conductive material layer arranged on the edge reserved on the glass panel, wherein the conductive material layer is in contact with a periphery of the high-resistance film, and the conductive material layer is connected to a GND pin of the TFT substrate through a conductive silver paste, wherein a square resistance of the conductive material layer is less than or equal to 1K ohm.

2. The electrostatic discharge structure of a liquid crystal display panel according to claim 1, wherein the conductive material layer is arranged on the edge of the glass panel by coating or plating, the conductive silver paste connects two GND pins of the TFT substrate to different positions of the conductive material layer respectively in two segments.

3. The electrostatic discharge structure of a liquid crystal display panel according to claim 2, wherein the glass panel completely covers at least an AA area of the liquid crystal display panel.

4. A liquid crystal display panel comprising at least a TFT substrate, a CF substrate arranged opposite to the TFT substrate, and a liquid crystal layer between the TFT substrate and the CF substrate; wherein an outermost layer of the CF substrate is a glass panel, a high-resistance film is mounted on the glass panel, an edge is reserved around a periphery of the glass panel covered with the high-resistance film, and a conductive material layer is arranged on the edge reserved by the glass panel, the conductive material layer is in contact with a periphery of the high-resistance film, and the conductive material layer is connected to a GND pin of the TFT substrate through a conductive silver paste, wherein a square resistance of the conductive material layer is less than or equal to 1K ohm.

5. The liquid crystal display panel according to claim 4, wherein the conductive material layer is arranged on the edge of the glass panel by coating or plating, the conductive silver paste connects two GND pins of the TFT substrate to different positions of the conductive material layer respectively in two segments.

6. The liquid crystal display panel according to claim 5, wherein the glass panel completely covers at least an AA area of the liquid crystal display panel.

7. A liquid crystal display device comprising a liquid crystal display panel, wherein the liquid crystal display panel comprises at least a TFT substrate, a CF substrate arranged opposite to the TFT substrate, and a liquid crystal layer between the TFT substrate and the CF substrate; wherein an outermost layer of the CF substrate is a glass panel, a high-resistance film is mounted on the glass panel, an edge is reserved around a periphery of the glass panel covered with the high-resistance film, and a conductive material layer is arranged on the edge reserved by the glass panel, the conductive material layer is in contact with a periphery of the high-resistance film, and the conductive material layer is connected to a GND pin of the TFT substrate through a conductive silver paste, wherein a square resistance of the conductive material layer is less than or equal to 1K ohm.

8. The liquid crystal display device according to claim 7, wherein the conductive material layer is arranged on the edge of the glass panel by coating or plating, the conductive silver paste is two segments, respectively connecting two GND pins of the TFT substrate with different positions of the conductive material layer.

9. The liquid crystal display device according to claim 8, wherein the glass panel completely covers at least an AA area of the liquid crystal display panel.

* * * * *